(12) United States Patent
Schrock et al.

(10) Patent No.: US 10,083,196 B2
(45) Date of Patent: Sep. 25, 2018

(54) CREATING SECURE VIRTUAL DATABASES STORING MASKED DATA

(71) Applicant: Delphix Corp., Redwood City, CA (US)

(72) Inventors: Eric Noah Schrock, Atlanta, GA (US); Hubert Ken Sun, Menlo Park, CA (US); Matthew Allan Ahrens, San Francisco, CA (US); Matthew Benjamin Amdur, Cambridge, MA (US)

(73) Assignee: Delphix Corporation, Menlo Park, CA (US)

( * ) Notice: Subject to any disclaimer, the term of this patent is extended or adjusted under 35 U.S.C. 154(b) by 49 days.

(21) Appl. No.: 15/013,147

(22) Filed: Feb. 2, 2016

(65) Prior Publication Data

US 2016/0224797 A1    Aug. 4, 2016

Related U.S. Application Data

(60) Provisional application No. 62/111,953, filed on Feb. 4, 2015.

(51) Int. Cl.
*G06F 21/62* (2013.01)
*G06F 17/30* (2006.01)

(52) U.S. Cl.
CPC .. *G06F 17/30342* (2013.01); *G06F 17/30368* (2013.01); *G06F 21/6227* (2013.01)

(58) Field of Classification Search
CPC ........... G06F 21/6218; G06F 17/30368; G06F 17/30342; G06F 21/6227
See application file for complete search history.

(56) References Cited

U.S. PATENT DOCUMENTS

| | | |
|---|---|---|
| 5,819,292 A | 10/1998 | Hitz et al. |
| 7,107,385 B2 | 9/2006 | Rajan et al. |
| 7,225,204 B2 | 5/2007 | Manley et al. |

(Continued)

OTHER PUBLICATIONS

Boppana, U., "Using FlexClone to Clone Files and LUNs," NetApp Technical Report, Mar. 2010, 32 Pages.

(Continued)

*Primary Examiner* — Yonas Bayou
(74) *Attorney, Agent, or Firm* — Fenwick & West LLP

(57) ABSTRACT

A database storage system creates secure snapshots or virtual databases based on a source database that stores sensitive information. The database storage system applies a masking function to the sensitive data and stores the masked data in the secure snapshot. The database storage system creates secure snapshots that share masked database blocks with other secure snapshots. The database storage system shares masked database blocks by storing information identifying a previously created masked database block for a new secure snapshot. If a masked database block for the new secure snapshot is different from the previously created masked database block, the database storage system stores metadata including the difference between the two masked database blocks. The database storage system allows sharing any transformed database blocks across snapshot, if the transformed database blocks are obtained by applying a transformation function to data of the source database.

28 Claims, 11 Drawing Sheets

(56) References Cited

U.S. PATENT DOCUMENTS

| | | | |
|---|---|---|---|
| 7,334,094 | B2 | 2/2008 | Fair |
| 7,334,095 | B1 | 2/2008 | Fair et al. |
| 7,340,461 | B2 | 3/2008 | Vishlitzky et al. |
| 7,373,364 | B1 | 5/2008 | Chapman |
| 7,386,695 | B2 | 6/2008 | Fuente |
| 7,409,511 | B2 | 8/2008 | Edwards et al. |
| 7,457,982 | B2 | 11/2008 | Rajan |
| 7,539,836 | B1 | 5/2009 | Klinkner |
| 7,587,563 | B1 | 9/2009 | Teterin et al. |
| 7,590,660 | B1 | 9/2009 | Richards et al. |
| 7,631,021 | B2 | 12/2009 | Sarma et al. |
| 7,743,035 | B2 | 6/2010 | Chen et al. |
| 7,757,056 | B1 | 7/2010 | Fair |
| 7,822,758 | B1 | 10/2010 | Prakash et al. |
| 7,827,366 | B1 | 11/2010 | Nadathur et al. |
| 7,856,424 | B2 | 12/2010 | Cisler et al. |
| 7,877,357 | B1 | 1/2011 | Wu et al. |
| 7,937,547 | B2 | 5/2011 | Liu et al. |
| 7,941,470 | B2 | 5/2011 | Le et al. |
| 7,996,636 | B1 | 8/2011 | Prakash et al. |
| 8,037,032 | B2 | 10/2011 | Pershin et al. |
| 8,150,808 | B2* | 4/2012 | Zha ............... G06F 17/30566 707/609 |
| 8,280,858 | B2 | 10/2012 | Ahrens et al. |
| 8,311,988 | B2 | 11/2012 | Cisler et al. |
| 8,532,973 | B1 | 9/2013 | CaraDonna et al. |
| 8,572,401 | B1* | 10/2013 | Patil ................ G06F 21/6218 707/610 |
| 8,775,663 | B1 | 7/2014 | Singh |
| 9,317,315 | B2* | 4/2016 | Mehta ............... G06F 9/45558 |
| 9,639,429 | B2* | 5/2017 | Stewart ............. G06F 11/1458 |
| 9,754,116 | B1* | 9/2017 | Roth ................ G06F 21/602 |
| 2001/0044807 | A1* | 11/2001 | Kleiman .......... G06F 17/30067 |
| 2002/0083037 | A1 | 6/2002 | Lewis et al. |
| 2003/0093443 | A1* | 5/2003 | Huxoll ............. G06F 11/1466 |
| 2003/0093444 | A1* | 5/2003 | Huxoll ............. G06F 11/1471 |
| 2007/0011137 | A1* | 1/2007 | Kodama .......... G06F 17/30088 |
| 2008/0022133 | A1* | 1/2008 | Sobel ................ G06F 21/6218 713/193 |
| 2008/0046479 | A1* | 2/2008 | Pareek ............. G06F 17/30368 |
| 2008/0307345 | A1 | 12/2008 | Hart et al. |
| 2009/0037486 | A1* | 2/2009 | Ozawa ................ G06F 21/604 |
| 2009/0222496 | A1 | 9/2009 | Liu et al. |
| 2011/0161295 | A1* | 6/2011 | Ngo .................. G06F 11/1471 707/639 |
| 2012/0110328 | A1* | 5/2012 | Pate ................. G06F 21/6218 713/165 |
| 2016/0224259 | A1* | 8/2016 | Ahrens ............... G06F 3/0619 |
| 2016/0267105 | A1* | 9/2016 | Sun ................. G06F 17/30088 |
| 2016/0283404 | A1* | 9/2016 | Xing ................ G06F 21/53 |

OTHER PUBLICATIONS

Creek, T., "Applications for Writeable LUNs and LUN Cloning in Oracle Environments," NetApp, Technical Report, Jun. 2003, 10 Pages.

Degwekar, A., "Using SnapMirror with SnapDrive for UNIX," NetApp Technical Report, 2007, 11 Pages.

Gmane, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.

Gmane, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.opensolaris.zfs/194/match=clone>.

Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/224/match=cloning>.

Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/229/match=zfs+clone+promotion>.

Gmane, Discussion regarding "ZFS snapshot improvement," From the zfs-discuss@opensolaris.org mailing list, May 10, 2006, 1 Page, Can be retrieved at <URL:http://article.gmane.org/gmane.os.solaris.openolaris.zfs/232/match=snapshot>.

Gmane, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.

Higgins, B., et al., "Backup and Recovery Snap Manager for SQL Server," DLA Piper, Nov. 2008, 37 Pages.

Hitz, D., et al., "File System Design for an NFS File Server Appliance," Technical Report, USENIX, Winter 1994, 23 Pages.

Jackson, J., "ZFS: The future for storage networks?: File system has massive capacity, but licensing issues and architectural concerns persist," Government Computer News, Media, Inc., Jun. 25, 2007, 2 Pages.

Kay, D., "Working with ZFS Snapshots," Solaris 10 How-To Guides, Version 1.0, Sun Microsystems, Inc., Jan. 5, 2009, 8 Pages.

Kilvansky, M., "A Thorough Introduction to FlexClone Volumes," NetApp, Technical White Paper, Oct. 2004, 35 Pages.

Lal, J., et al., "DB2: Cloning a Database using NetApp FlexClone Technology," NetApp, Apr. 30, 2006, 60 Pages.

Merrill, J., et al., "SnapVault Best Pratices Guide," NetApp Technical Report, 2008, 29 Pages.

Nadgir, N., "Databases and ZFS," Oracle Blog, Sep. 25, 2006, 8 Pages, Can be retrieved from <URL:https://blog.oracle.com/realneel/entry/zfs_and_databases>.

Network Appliance, Inc., "Data ONTAP 7.2 Commands: Manual Page Reference, vol. 1," May 16, 2008, 615 Pages.

Network Appliance, Inc., "NetApp Data Management for Decision Support Systems," 2005-2010, 4 Pages.

Network Appliance, Inc., "Flexvol and Flexclone Software," 2006, 2 Pages.

Network Appliance, Inc., "SnapManager 3.0 for Oracle Installation and Administration Guide," Nov. 2008, 294 Pages.

Network Appliance, Inc., "SnapManager 2.2 for Oracle Installation and Administration Guide," Nov. 2007, 310 Pages.

Network Appliance, Inc., "SnapManager 5.0 for Microsoft Sql Server Installation and Administration Guide," Oct. 2008, 492 Pages.

Network Appliance, Inc., "Network Appliance Snapmirror Software," 2006, 2 Pages.

Oracle, "Oracle Database Backup and Recovery User's Guide," 11g Release 1(11.1), Aug. 2008, 598 Pages.

Osuna, A., "An Introduction to FlexClone Volumes" Redbooks, IBM, 2006, 50 Pages.

Osuna, A., "Using IBM DB2 UDB with IBM System Storage N series" Redbooks, IBM, Dec. 2006, 136 Pages.

Osuna, A., "Data Protection Strategies in IBM System Storage N Series" Redbooks, IBM, Jun. 2008, 90 Pages.

Osuna, A., "IBM System Storage N Series SnapMirror" Redbooks, IBM, Jul. 2006, 124 Pages.

Osuna, A., "IBM System Storage N Series SnapVault Best Practices Guide" Redbooks, IBM, 2007, 54 Pages.

Patel, D., et al., "Rapid Database Development and Deployment," NetApp White Paper, Mar. 2007, 11 Pages.

Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.

Sadagopan, P., et al., "Oracle Fusion Middleware DR Solution Using NetApp Storage," NetApp Technical Report, May 2008, 38 Pages.

Schuettinger, S., "NetApp Technical Report—Rapid Deployment of Oracle Database 11g Using VMWare Infrastructure and NetApp Flexclone," NetApp, Jan. 2008, 24 Pages.

(56) References Cited

OTHER PUBLICATIONS

Schuettinger, S., "Helping DBAs Become More Efficient NetApp Efficiency and Manageability Advantages," NetApp White Paper, Jul. 2009, 12 Pages.
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Watanabe, S., "Solaris 10 ZFS Essentials," Sun Microsystems, 2010, 146 Pages.
Wikipedia, "ZFS," Last Modified Jul. 22, 2014, 14 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage SAN Volume Controller Software V4.3.0 introduces space-efficient VDisks and VDisk mirroring," IBM United States Announcement 208-114, May 13, 2008, 17 Pages.
Microsoft, "Microsoft Developer's Network, Pages and Extents," Microsoft Corporation ("Pages and Extents") Sep. 2007, 2 Pages.
Mullins, "Excerpts of DB2 Developer's Guide, Fifth Ed." May 2004, 5 Pages.
NetApp, 2007 NetApp, Inc., Data ONTAP 7.1 Data Protection Online Backup and Recovery Guide, NetApp Technical Doc, Jan. 12, 2007, pp. 508.
NetApp, "Datasheet FlexClone," NetApp Technical Doc, 2008, 2 Pages.
NetApp, "Datasheet FlexVol™ and FlexClone™ Software," NetApp Technical Doc, 2004, 2 Pages.
NetApp, "Datasheet Netapp SnapManager for Oracle," NetApp Technical Doc, 2008, 2 Pages.
NetApp, "Datasheet NetApp SnapMirror," NetApp Technical Doc, 2008, 2 Pages.
NetApp, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS the File System of the Future," Apr. 27, 2009, 19 Pages.
Tate, J., et al., "Implementing the IBM System Storage SAN Volume Controller V4.3," IBM Redbook SG24-6423-06, Oct. 2008, 970 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,566,361, Oct. 21, 2014, 99 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,566,361, Oct. 21, 2014, 66 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 7, 2014, 65 Pages.
Petition for Inter Partes Review of U.S. Pat. No. 8,548,944, Oct. 8, 2014, 66 Pages.
Petition for Inter Partes Review of U.S. Pat. No. 8,548,944, Oct. 8, 2014, 65 Pages.
Final Written Decision, Before the Patent Trial and Appeal Board of United States Patent and Trademark Office, Case IPR2015-00034, U.S. Pat. No. 8,150,808 B2, Apr. 16, 2016, 100 Pages.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00025 & IPR2015-00026, U.S. Pat. No. 8,161,077 B2, Apr. 12, 2016, 94 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Final Written Decision, Before the Patent Trial and Appeal Board of United States Patent and Trademark Office, Case IPR2015-00108, U.S. Pat. No. 8,566,361 B2, Apr. 29, 2016, 61 Pages.
Final Written Decision, Before the Patent Trial and Appeal Board of United States Patent and Trademark Office, Case IPR2015-00108, U.S. Pat. No. 8,566,361 B2, May 11, 2016, 57 Pages.

\* cited by examiner

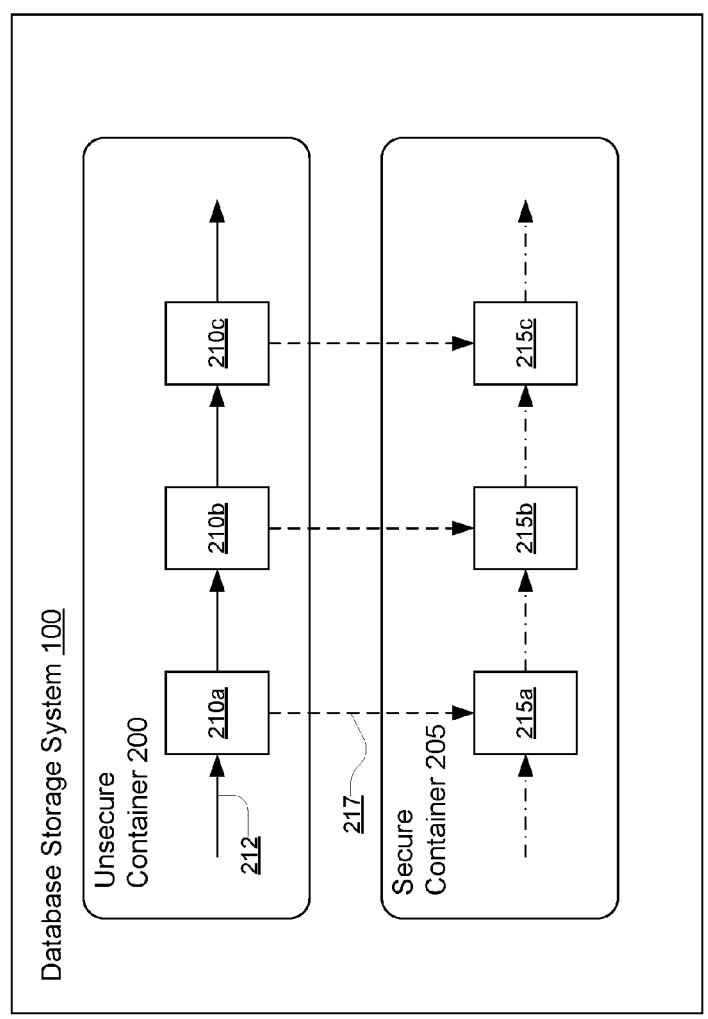

CREATING SECURE VIRTUAL DATABASES STORING MASKED DATA

CROSS REFERENCES TO RELATED APPLICATIONS

This application claims the benefit of U.S. Provisional Application No. 62/111,953, filed on Feb. 4, 2015, which is incorporated by reference in its entirety.

BACKGROUND

This invention relates generally to masking sensitive data in databases and in particular to creating secure virtual databases that store sensitive data obtained from a source database as masked data.

Software applications used by enterprises often incorporate sensitive data for which access must be carefully controlled. Certain privileged users may be allowed access to the sensitive data. However, several users of systems of an enterprise may not be given access to the sensitive data. These users need to handle representative data for specific purposes. For example, if there is a defect or bug in a program, developers and testers often need to reproduce the conditions under which the defect was caused. This often requires using the original dataset, for example, to reproduce the original conditions. However, the developers and testers are not privileged users and are not allowed to have access to the sensitive data. Enterprises often use data masking to transform or obfuscate the sensitive data such that the original sensitive data cannot be discerned by users.

This masking operation is typically handled by people specializing in information technology (IT) infrastructure management, and involves creating copies of the data and masking them before making the copies available to the developer. This process is time consuming and cumbersome. Furthermore, keeping copies of masked data requires additional storage. If developers and testers make copies of the original dataset on a regular basis, the amount of additional storage used for storing the masked data can become significant. Conventional data masking techniques have shortcomings in the way they make secure data available to application developers and the way the secure data is stored. These shortcomings become worse when applied across multiple application versions, distributed development teams, and different security roles.

SUMMARY

To address the needs unmet by existing database technologies, a database storage system creates secure containers based on source databases that store sensitive data. A container is comprised of multiple snapshots representing different points in time from the same source database. The database storage system efficiently stores data by sharing database blocks across snapshots. The database storage system masks sensitive data by updating the original data obtained from the source database by applying a masking function to the data. The database storage system makes a copy of a database block if the database block is updated, for example, as a result of applying the masking function. Embodiments share masked database blocks across secure snapshots, thereby allowing efficient storage of secure virtual containers.

According to an embodiment, the database storage system receives information identifying a source database that stores sensitive data. The database storage system creates a secure container that store secure snapshots representing data obtained at different points in time from the source database. The database storage system receives a request to create a secure snapshot that masks the sensitive data by applying a masking function. The database storage system creates the secure snapshot that shares masked database blocks with one or more other secure snapshots.

To create the secure snapshot, the database storage system processes input database blocks of a point-in-time copy of the source database that include sensitive data as follows. The database storage system identifies a previously created secure snapshot within the virtual container. The database storage system applies the masking function to sensitive data of the source database. The database storage system matches the input database block and the previously created masked database block. If the database storage system determines that the two database blocks match, the database storage system stores metadata information identifying the previously created database block as representing the input database block.

In an embodiment, the database storage systems matches the previously created database block against the input database block by creating a masked input database block by applying the masking function to the input database block. The database storage system compares the masked input database block and the previously created masked database block. If the masked input database block and the previously created database block are identical, the database storage system determines that the two database blocks match.

However, even if the masked input database block and the previously created database block are not identical, the database storage system determines that the two database blocks match if the difference between the two database blocks can be stored in less than a threshold amount of storage space. If the difference between the two database blocks cannot be stored in less than a threshold amount of storage space, the database storage system allocates and stores a new database block for storing the masked input database block for the secure virtual database being created.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 2A shows an example of creation of secure snapshots in a secure container from unsecure snapshots of an unsecure container storing point-in-time copies obtained from a source database, according to an embodiment of the invention.

Figure 1:
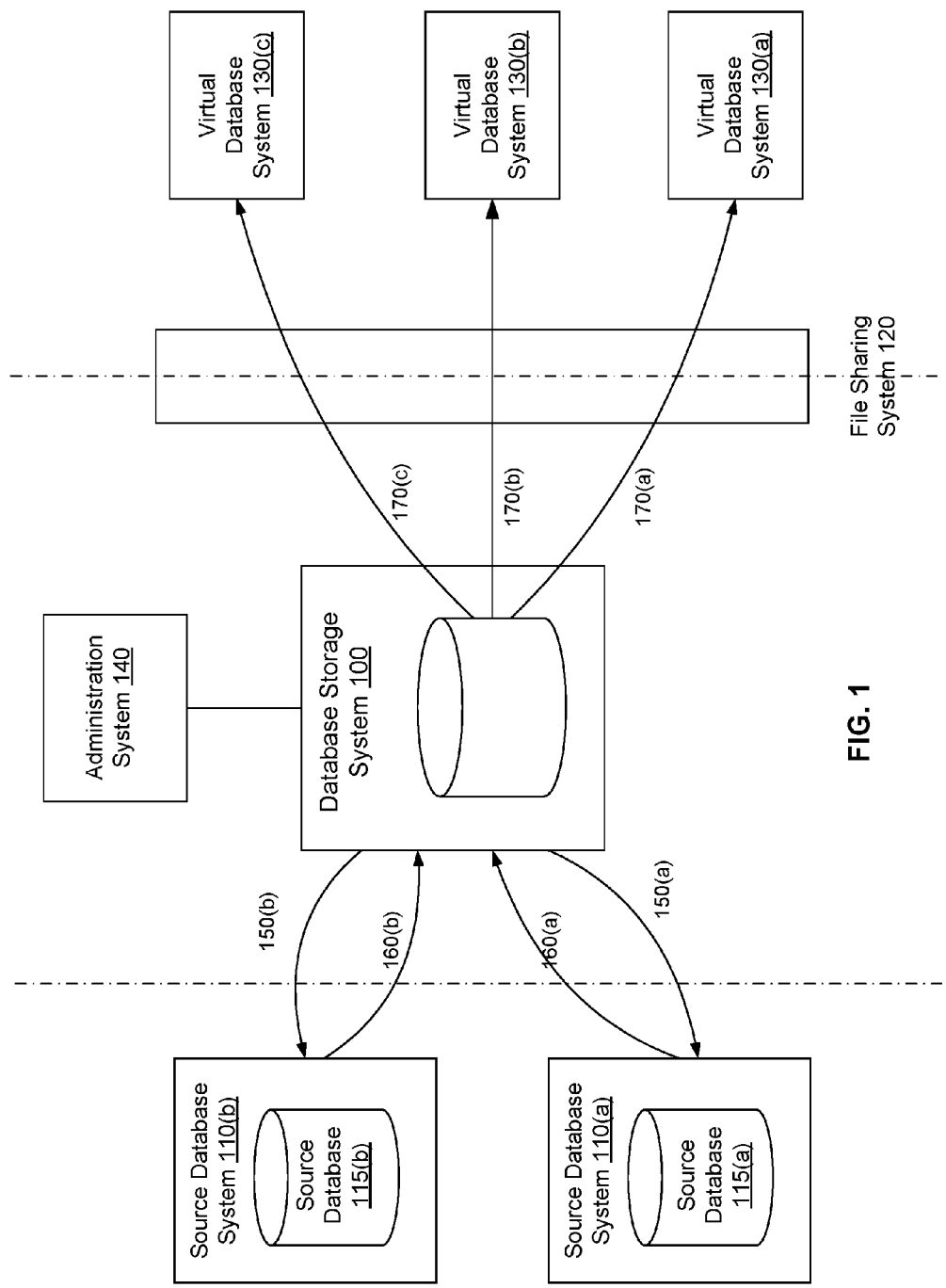
FIG. 1 is diagram illustrating copying of information from a source database to a database storage system for provisioning as virtual databases, according to an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A database storage system creates virtual databases that share database blocks with other virtual databases. This allows the database storage system to efficiently store the data of each virtual database, thereby allowing several virtual databases to be stored using small amount of storage space. For example, assume that a virtual database V1 is created that includes a set of database blocks of a source database associated with a point in time T1. A subsequent virtual database V2 is created that includes a set of database blocks associated with a point in time T2. If 1% of the database blocks are modified in the source database between times T1 and T2, the two virtual databases V1 and V2 can share 99% of database blocks that did not get modified between T1 and T2. Accordingly, the amount of additional storage space required for storing database blocks for V1 and V2 together is approximately 1% more than the amount of storage space required for storing virtual database V1 alone.

However for each virtual database stored in the database storage system, additional storage space is required as database blocks get updated for the individual virtual databases. This is so because the database storage system makes a copy of a database block if the data of the database block is modified. If a virtual database stores sensitive data that needs to be masked, the database storage system updates the sensitive data with masked values obtained by applying a masking function to the original sensitive data. As a result the database storage system modifies the database blocks that store sensitive data and makes a copy of these database blocks.

Copying database blocks storing masked data results in reduction of the storage efficiency of the virtual databases in the database storage system. If 20% of the data of virtual database V1 and V2 is masked, each of the virtual databases V1 and V2 uses 20% additional storage space. Furthermore, each subsequent virtual database that is created requires at least 20% additional storage for the masked database blocks. Accordingly, instead of requiring only 1% additional data based on an assumption that 1% of original data changed between the points in time associated with two subsequent virtual databases, secure virtual databases storing masked data require 20% additional storage space per secure virtual database. In general, if M % of data of virtual databases is masked, and N virtual databases are created, the additional storage space required due to the masking operation is approximately M×N %. Over a long period of time, if several secure virtual databases are created that store masked data, the advantage of storage savings obtained by use of virtual databases significantly diminishes.

However, embodiments allow virtual databases to share database blocks that store masked database blocks. Accordingly, the database storage system shares masked database blocks of virtual database V1 and V2 in the above example. As a result, only 20% additional storage space is required to store the masked database blocks for the virtual database V1. The virtual database V2 can share the masked database blocks of virtual database V1 and does not require an additional 20% storage. In general if M % of data of virtual databases is masked, and N virtual databases are created, embodiments allow the N virtual database to be stored such that only M % additional storage space is required to store the masked database blocks (instead of M×N %.) The above calculations are simplified, for example, there may be additional storage required to store metadata for each virtual database. However, the amount of storage space required to store metadata is significantly less than the amount of storage requires for storing copies of database blocks for a typical virtual database.

Virtual Database Systems

A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like. A database may be implemented using a database model, for example, a relational model, object model, hierarchical mode or network model.

In certain embodiments of the invention, one or more virtual databases are created based on the state of a source database or another virtual database at a particular point in time. These virtual databases can be individually accessed and modified as desired. The virtual databases are "virtual" in the sense that the physical implementation of the database files is decoupled from the logical use of the database files by a database server. Virtual database systems are described in U.S. patent application Ser. No. 12/603,541 filed on Oct. 21, 2009, now issued as U.S. Pat. No. 8,150,808, which is incorporated by reference herein in its entirety.

In one embodiment, information from a source database is copied to a storage system at various times, such as periodically. This enables reconstruction of the database files associated with the source database for these different points in time. The information may be managed in the storage system in an efficient manner so that copies of information are made only if necessary. For example, if a portion of the database is unchanged from a version that was previously copied, that unchanged portion need not be copied. In an embodiment, the database storage system represents point-in-time copies obtained from the source database as snapshots that share database blocks with other snapshots.

A virtual database created for a point in time is stored as a set of files that contain the information of the database as available at that point in time. Each file includes a set of database blocks and the data structures for referring to the database blocks. A virtual database may be created on a database server by creating the database files for the source database corresponding to the state of the source database at a previous point in time, as required for the database server.

The files corresponding to the virtual database are made available to the database server using a file sharing mechanism, which links the virtual database to the appropriate database blocks stored on the storage system. The process of making the virtual database available to a database server is called "provisioning" the virtual database. In some embodiments, provisioning the virtual database includes managing the process of creating a running database server based on virtual database. Multiple virtual databases can be provisioned based on the state of the source database at the same point in time. On the other hand, different virtual databases can be based on different point in time state of the same source database or different source databases.

A database block may be shared between different files, each file associated with a different virtual database. In particular, a database block is shared if the virtual database systems 130 that can access the database block only read the information in the database block and do not write to the database block. In one embodiment, the virtual database manager 330 makes copies of the database blocks only if necessary. For example, a particular database block may be shared by multiple virtual databases that read from the same database block. But if one of virtual database systems 130 attempts to write to the database block, a separate copy of the database block is made because the writing operation causes that database block to be different for the virtual database corresponding to that virtual database systems 130 than it is for the other virtual databases. The virtual database system 130 that attempts to write to the database block is provided access to the copy of the database block, allowing the virtual database system 130 to modify the copy of the database block without affecting the original database block that may be shared by other virtual databases.

FIG. 1 is diagram illustrating copying of information from a source database to a database storage system for provisioning as virtual databases, according to an embodiment of the invention. The source database systems 110 manage data for an organization. The database storage system 100 retrieves data of source databases stored in one or more source database systems 110 and stores the data in an efficient manner, further described below. A database administrator user interface allows a database administrator to perform various actions supported by the database storage system 100.

In response to a request from the administration system 140, or based on a predefined schedule, the database storage system 100 sends a request 150 for data to a source database system 110. The source database system 110 responds by sending information stored in the source database as a stream of data 160. The request 150 is sent periodically and the source database system 110 responds by sending information representing changes of data stored in the source database since the last response 160 sent by the source database system 110. The database storage system 100 receives the data 160 sent by the source database system 110 and stores the data. The database storage system 100 stores the information efficiently, for example, by keeping versions of database blocks that have changed and reusing database blocks that have not changed.

To create a virtual database, the database storage system 100 creates files that represent the information corresponding to the source database system 110 at a given point in time. The database storage system 100 exposes 170 the corresponding files to a virtual database system 130 using a file sharing system 120. The virtual database system 130 runs a database server that can operate with the files exposed 170 by the database storage system 100. Hence, a virtual copy of the source database is created for the virtual database system 130 for a given point in time in a storage efficient manner. The virtual copy representing a point-in-time copy of the source database is also referred to herein as a snapshot.

In an embodiment, the database storage system 100 maintains a container that represents multiple snapshots of a source database obtained at different points in time. A container may store transaction logs corresponding to the point-in-time copies that describe changes performed on a source database along a time line. The representation of information associated with a source database along a time line is also referred to as timeflow. Management of timeflows is described in U.S. patent application Ser. No. 14/324,485 filed on Jul. 7, 2014, which is incorporated by reference herein in its entirety.

A container may be an unsecure container or a secure container. An unsecure container represents unsecure snapshots that store unmasked sensitive data. The unmasked sensitive data corresponds to sensitive data in its original format as obtained from the source database. The database storage system creates unsecure VDBs using the unsecure snapshots. The database storage system may require a use to have certain privileges to access sensitive data of unsecure VDBs. A secure container represents secure snapshots that store sensitive data in masked format. The database storage system creates secure VDBs from secure snapshots of a secure container. The database storage system allows access to secure VDBs to users with lower privileges compared to users allowed to access unsecure VDBs. In an embodiment, the database storage system creates a secure container corresponding to an unsecure container. The database storage system creates secure snapshots for the secure container corresponding to unsecure snapshots of the unsecure container.

FIG. 2A shows an example of creation of secure snapshots in a secure container from unsecure snapshots of an unsecure container storing point-in-time copies obtained from a source database, according to an embodiment of the invention. The unsecure snapshots store sensitive data in an unmasked form. The database storage system 100 maintains representation of an unsecure container 200 and a representation of a secure container 205. The unsecure container 200 stores unsecure snapshots 210a, 210b, and 210c associated with a timeflow. The database storage system 100 creates secure snapshots 215a, 215b, and 215c based on the unsecure VDBs 410a, 410b, and 410c respectively. The secure snapshots store sensitive data in a masked form. In an embodiment, the database storage system 100 obtains the secure snapshot from an unsecure snapshot as follows. The database storage system 100 creates an unsecure VDB representing the source database from the unsecure snapshot. The database storage system 100 applies the masking function to sensitive data of the unsecure VDB to obtain a secure VDB. The database storage system 100 obtains the secure snapshot 215 using the database blocks of the secure VDB. The database storage system 100 allows creation of secure VDBs that store sensitive data in a masked format from the secure snapshots 215.

Figure 2B:
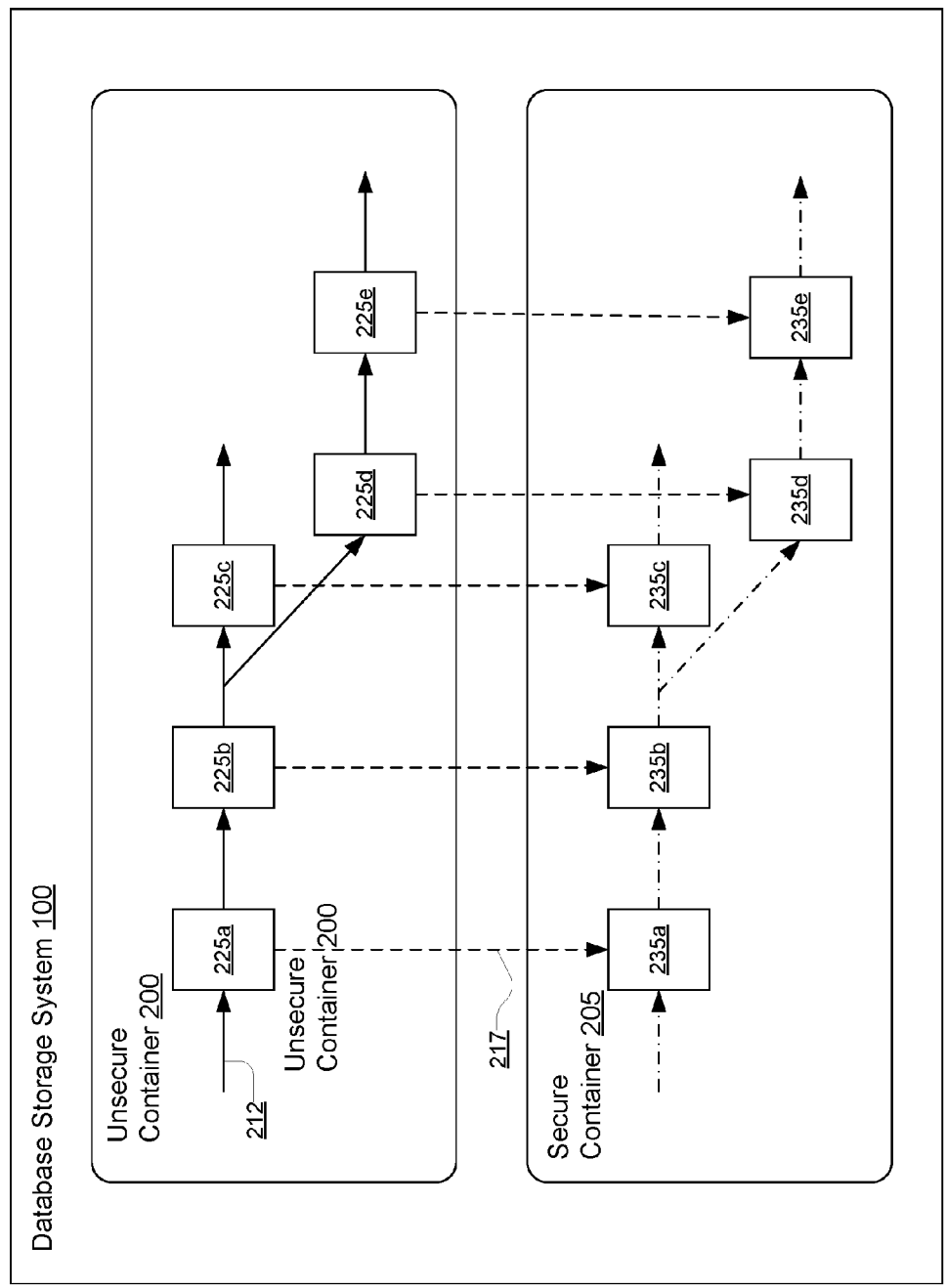
FIG. 2B shows an example of creation of secure snapshots in a secure container from unsecure snapshots of an unsecure container storing point-in-time copies obtained from a source database, according to an embodiment of the invention.

FIG. 2B shows an example of creation of secure snapshots in a secure container from unsecure snapshots of an unsecure container storing point-in-time copies obtained from a source database, according to an embodiment of the invention. FIG. 2B illustrates creation of a new timeflow within the unsecure container 200 from an existing timeflow. As shown in FIG. 2B, the unsecure snapshot 225d is created by cloning the data of the snapshot 225b. Accordingly, the snapshot 225b has two child snapshots, 225c and 225d that can be modified independently. New snapshots or VDBs can be created based on each child snapshot of the snapshot 225b. For example, snapshot 225e is created as a child snapshot of snapshot 225d. The database storage system 100 creates secure snapshot 235 for secure container 205 based on the unsecure snapshot 225 of the unsecure container 200. Accordingly, secure snapshot 235d and 235e are created from unsecure snapshot 225d and 225e. Embodiments allow sharing of masked database blocks of two secure snapshot created by masking database blocks of corresponding unsecure snapshot. The database storage system 100 allows creation of secure VDBs that store sensitive data in a masked format from the secure snapshots 235.

Figure 2C:
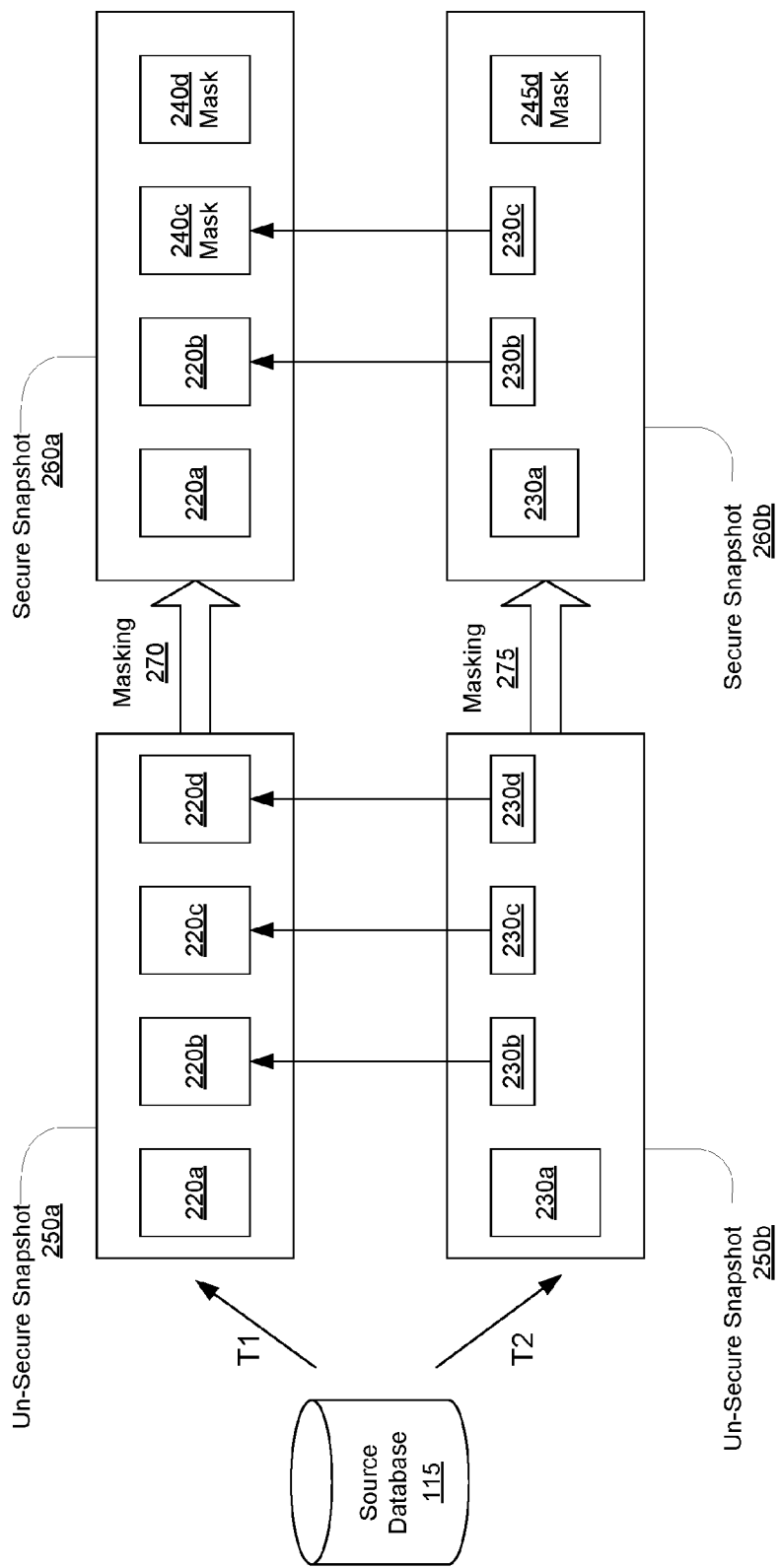
FIG. 2C illustrates sharing of data across virtual databases and impact of masking on sharing of data in virtual databases, according to an embodiment of the invention.

FIG. 2C illustrates sharing of data across snapshots and impact of masking on sharing of data in snapshots, according to an embodiment of the invention. As shown in FIG. 2C, the database storage system 100 creates and stores snapshots representing point-in-time copies of data of the source database 115. The source database 115 stores sensitive data that needs to be masked before certain users are allowed to access the data. For example, one or more tables of the source database may store sensitive data. The source database may also include data that is not identified as sensitive and therefore can be presented to users without being masked.

The database storage system 100 receives database blocks from the source database 115 at various points in time, for example, T1 and T2. The database storage system 100 may create un-secure snapshots 250 that store the sensitive data without masking or secure snapshots 260 that store the sensitive data as masked data. For example, certain privileged users may have permission to access the sensitive data of the source database 115. These privileged users may be provided access to un-secure VDBs created from the un-secure snapshots. Other users are not allowed to access the sensitive data. These users can be provided access to secure VDBs creates from the secure snapshots (but may not be provided access to un-secure VDBs created from un-secure snapshots.) Accordingly, the database storage system 115 creates un-secure snapshots 250 and provides access to the data of un-secure snapshots 250 to the privileged users. The database storage system 100 creates secure snapshots 260 and provides access to the data of the secure snapshots 250 to the remaining users that are not privileged to access the sensitive data without masking.

As shown in FIG. 2C, the un-secure snapshot 250a is created based on data received at point in time T1 and the un-secure snapshot 250b is created based on data received at point in time T2. The two snapshot 250a and 250b may share database blocks. For example, FIG. 2C shows that database block 220a of snapshot 250a was modified, resulting in database block 230a in the snapshot 250b. Since the database blocks 220a and 230a store different data, these database blocks cannot be shared by the snapshot 250a and 250b.

However, the remaining database blocks 220b, 220c, and 220d of snapshot 250a are shared by the virtual database 250b. For example, the snapshot 250a may store pointers 230b, 230c, and 230d to the database blocks 220b, 220c, and 220d respectively of snapshot 250a instead of storing copies of these database blocks. It is possible, that snapshot 250a and 250b include pointers to database blocks received at an earlier point in time than T1.

The database storage system 100 creates secure snapshots 260a and 260b by masking 270, 275 sensitive data stored in the database blocks of the un-secure snapshots 250a and 250b. In an embodiment, the database storage system 100 creates a VDB based on an un-secure snapshot 250. The database storage system 100 performs the masking operation by applying a function to mask the sensitive data of the VDB created and replacing the sensitive data with the masked data. The database storage system 100 creates the secure snapshot from the database blocks underlying the VDB. As a result, the database blocks of an un-secure snapshot that store sensitive data get modified (or updated). In an embodiment, the masking of the data is performed by executing an update statement on the columns of tables storing the sensitive data. For example, the database storage system 100 may execute an SQL (structured query language) update statement that replaces the sensitive data values with masked data values obtained by applying a masking function to the sensitive data values.

The database storage system 100 creates a copy of a database block if the database block is modified. Accordingly, when a database block of an un-secure virtual database is masked to create a secure virtual database, the database storage system 100 creates new database blocks to store the masked data. If a virtual database is sharing a database block with another virtual database and the database block is updated, the database storage system 100 creates a new database block to store the updated values and the virtual database is unable to share the database block with the other virtual database.

For example, as shown in FIG. 2C, the database storage system 100 creates database block 240d of snapshot 260a storing masked data corresponding to database block 220d of snapshot 250a. Similarly, the database storage system 100 creates database block 245d of snapshot 260b storing masked data corresponding to database block 230d of snapshot 250b. As shown in FIG. 2C, even though the database block 220d is shared between the snapshots 250a and 250b, the corresponding masked database block 240d is not shared between the secure virtual databases 260a and 260b. In other words, the snapshot 260a stores database block 240d and snapshot 260b stores database block 245d as separate database blocks. This is so because the database storage system 100 creates as copy of the original database blocks 220d and 230d as they were modified (for masking). The data of the database block 240d may be identical to the data of the database block 245d since they were obtained by applying the same masking function to the same input values. However, since the database blocks 240d and 245d were obtained by modifying a database block (shared by the snapshot 250a, 250b), the database blocks 240d and 245d are not shared.

Embodiments of the invention determine which database blocks storing masked data can be shared across snapshot even though the database blocks storing the masked data are obtained by modifying (updating) database blocks. In other words, the database storage system 100 determines that the masked database block 240d can be shared between the snapshot 260a and 260b and does not allocate explicit storage for the database block 245d but instead uses the data of the database block 240d (for example, by storing only a pointer to the database block 240d).

The database storage system 100 may determine that the database block 240d can be shared between the snapshot 260a and 260b by generating the masked data of the database block 245*d* and comparing the masked data to the data of the database block 240*d*. Alternatively, the database storage system 100 may determine that the database block 240*d* can be shared between the snapshot 260*a* and 260*b* based on the information that the corresponding source database blocks of the un-secure snapshot 250*a* and 250*b* are shared, accordingly the database blocks 240*d*, 245*d* obtained by applying the masking function can also be shared.

System Architecture

Figure 3:
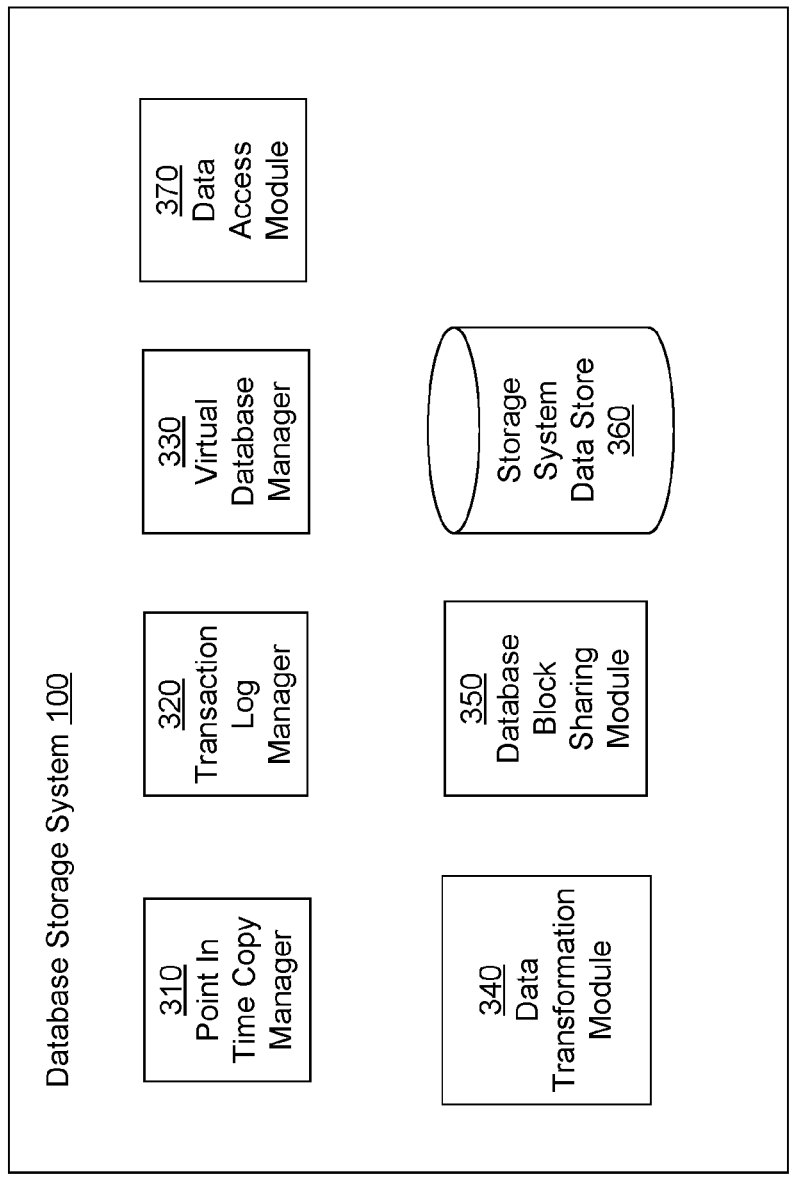
FIG. 3 illustrates the architecture of a database storage system for creating secure virtual databases, in accordance with an embodiment of the invention.

FIG. 3 illustrates the architecture of a database storage system for creating secure virtual databases, in accordance with an embodiment of the invention. The database storage system 100 includes a point-in-time copy manager 310, a transaction log manager 320, a virtual database manager 330, a data transformation module 340, a database block sharing module 350, a data access module 370, and a storage system data store 360. In alternative configurations, different and/or additional modules can be included in the database storage system 100. Furthermore, functions performed by a particular module may be performed by other modules than those indicated herein.

The point-in-time copy manager 310 interacts with the source database system 110 by sending a request to the source database system 110 to retrieve information representing a point-in-time copy (also referred to as a "PIT copy") of the source database 115. The point-in-time copy manager 310 stores the data obtained from the source database 115 in the storage system data store 360. The representation of the data of a point-in-time copy of the source database in the database storage system is referred to herein as a snapshot. The data retrieved by the point-in-time copy manager 310 corresponds to database blocks (or pages) of the database being copied from the source database. After a first PIT copy request to retrieve information stored in source database 115, a subsequent PIT copy request may need to retrieve only the data that changed in the database since the previous request. The data collected in the first request can be combined with the data collected in a second request to reconstruct a copy of the source database corresponding to a point in time at which the data was retrieved from the source database 115 for the second request.

The transaction log manager 320 sends request to the source database system 110 for retrieving portions of the transaction logs stored in the source database system 110. The data obtained by the transaction log manager 320 from the source database system 110 is stored in the storage system data store 360. In one embodiment, a request for transaction logs retrieves only the changes in the transaction logs in the source database system 110 since a previous request for the transaction logs was processed. The database blocks retrieved by a point in time copy manager 310 combined with the transaction logs retrieved by the transaction log manager 320 can be used to reconstruct a copy of the source database corresponding to times in the past in between the times as which point-in-time copies are made.

The virtual database manager 330 receives requests for creation of a virtual database for a virtual database system 130. The request for creation of a virtual database may be sent by a database administrator using the administration system 140 and identifies a source database system 110, a virtual database system 130, and includes a past point-in-time corresponding to which a virtual database needs to be created. The virtual database manager 330 creates the necessary files and data structures corresponding to the virtual database being created and shares the files with the virtual database system 130. The database administrator for a virtual database system 130 may be different from a database administrator for the source database system 110.

The storage system data store 360 stores data obtained from the source database systems 110. The storage system data store 360 stores various point-in-time copies associated with different points in time obtained from the source database systems 110. The point-in-time copies of a source database may share database blocks. For example, if a database block does not change between two points in time T1 and T2, the point-in-time copies associated with T1 and T2 may share the database block. The storage system data store 360 also stores transaction logs obtained from the source database systems 110. The storage system data store 360 stores data structures representing virtual databases created by the database storage system 100.

The database block sharing module 350 determines whether database blocks can be shared across virtual databases created by the virtual database manager 330. The database block sharing module 350 uses various criteria to determine whether a database block can be shared across virtual databases. For example, if a new secure virtual database is created by the virtual database manager 330, the virtual database manager 330 invokes the database block sharing module 350 to determine if a masked database block of a previously created secure virtual database can be shared with the virtual database being created. Details of the processes used for determining whether a masked database block can be shared across virtual databases are described herein.

The data transformation module 340 transforms data retrieved from the source databases by applying transformation functions to the data. An example of a transformation function is a masking function applied for obfuscating data. This may include, but is not limited to, masking out digits, replacing names from a dictionary, or mathematical transformations. As an example, the data transformation module 340 performs masking by replacing either a portion of a number (i.e., a string of digits) with one or more characters. For example, if a number represents a social security number or a credit card number, the transformation function may replace a prefix of the number with a character, such as 'x'. Accordingly, the data transformation module 340 replaces a number "123 456" with "xxx 456." In an embodiment, the data transformation module 340 performs masking by using a dictionary to map a term to another term. A dictionary may provide mappings from names people to different names. For example, the data transformation module 340 may use a dictionary to replace all occurrences of "Mark" with "Michael", all occurrences of "Mary" with "Nancy" and so on. The data transformation module 340 may mask numbers by performing certain mathematical transformation. For example, each digit may be replaced by the next digit in order of increasing value, such as replacing 0 by 1, 1 by 2, 2 by 3, 3, by 4, and so on and replacing 9 by 0. Accordingly, number "239" is replaced by "340". These are examples of masking functions and various other masking functions may be used by the data transformation module 340. For example, the data transformation module 340 may use cryptographic functions that map a value to another value from which decrypting the original value is not possible.

As described above, the data transformation module 340 masks data for creating secure snapshots. In an embodiment, the database storage system invokes the data transformation module 340 to mask the sensitive data obtained from a source database. The database storage system creates a VDB from a snapshot and the data transformation module 340 executes one or more database commands, for example SQL (structure query language) commands to replace data of the VDB with masked data. For example, if a database table T1 of the VDB includes a column credit_card_number storing sensitive data, the data of the column may be masked by executing a command "update T1 set credit_card_number=masking_function(credit_card_number, seed)" where "seed" is an input seed value used by the masking function.

The database storage system 100 may execute transactions that correspond to commands of a database query language executed for masking the data. The execution of transactions results in information specific to transactions being stored in the database blocks of the virtual database. For example, the database storage system 100 may store a transaction identifier associated with the transaction corresponding to the masking operation. As a result, if masked database blocks are generated from the same database block at different points in time, the masked database blocks generated may have differences. The differences in the generated masked database blocks represent a small portion of the masked database block. The exact differences in the masked database block that is generated from an input database block may depend on the type of database system (vendor specific) used to execute the commands for masking the data.

The data access module 370 receives and processes requests for accessing data of a virtual database and accesses the requested data. The data access module 370 identifies the database block storing the requested data, retrieves the database block to memory if necessary, and provides the requested data. If the request for data is received by a secure virtual database and the requested data is stored in a masked database block shared with another secure virtual database, the data access module 370 retrieves the metadata for the database block of the secure virtual database. The metadata identifies a previously stored masked database block and may include data representing a difference between the accessed block and the previously stored masked database block. The data access module 370 applies the difference to the previously stored masked database block before providing the requested data. Details of how the data access module 370 provides access to masked data of secure virtual databases is provided in FIG. 8.

Figure 4:
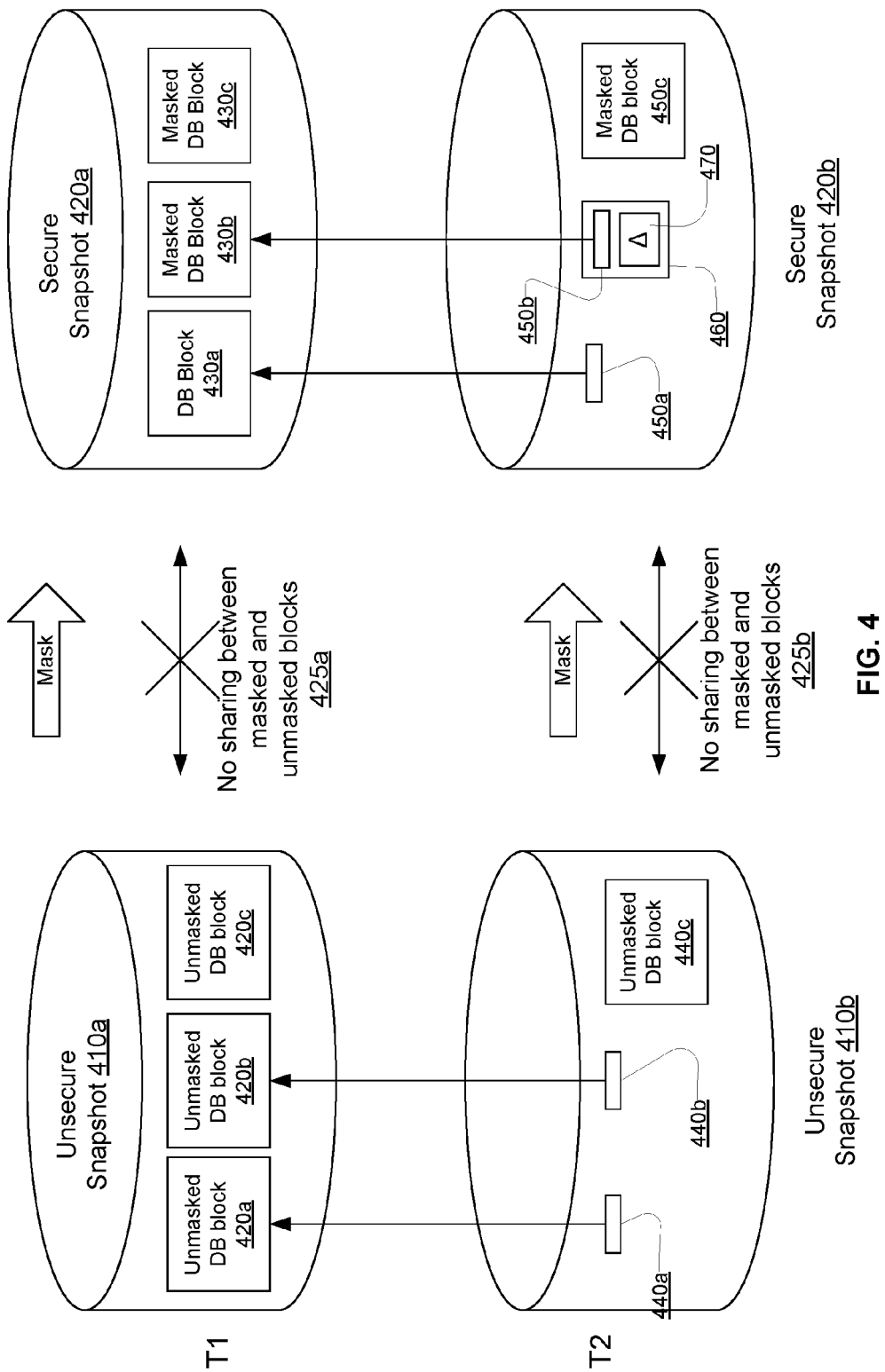
FIG. 4 illustrates sharing of database blocks across virtual databases, according to an embodiment of the invention.

FIG. 4 illustrates sharing of database blocks across snapshots, according to an embodiment of the invention. The database block sharing module 350 determines whether a previously stored database block can be reused for a snapshot being created. As shown in FIG. 4, two un-secure snapshots 410a and 410b are created based on points-in-time associated with a source database. At least a portion of the data of the source database is sensitive and needs to be masked before providing access to secure virtual databases created using the points-in-time copies of the source database. The snapshots 410a and 410b are un-secure and store the original values of sensitive data obtained from the source data. Accordingly, FIG. 4 shows database blocks 420a, 420b, 420c, and 440c as unmasked database blocks.

The snapshots 420a and 420b are secure snapshots and store masked version of the sensitive data (i.e., by replacing the values of sensitive data with values obtained by applying a masking function to the sensitive data.) Snapshot 420a is obtained by masking the sensitive data of the snapshot 410a and snapshot 420b is obtained by masking the sensitive data of the snapshot 410b. FIG. 4 shows a subset of database blocks of the snapshots for purposes of illustration of various scenarios of sharing the database blocks. Typical databases store a much larger number of databases than shown in FIG. 4.

As shown In FIG. 4, the data of the database blocks 420a and 420b is same for points in time T1 and T2. Accordingly, the database block sharing module 350 determines that the database blocks 420a and 420b can be shared across the snapshot 410a and 410b. Accordingly, the representation of the snapshot 410b stores data structures 440a and 440b indicating that the data of the database blocks 410a and 410b should be accessed when data of snapshot 410b is accessed. The data structures 440a and 440b may be pointers to the database blocks 420a and 420b.

Alternatively a bit representation may be used to indicate that blocks 420a and 420b are shared across the snapshots 410a and 410b. For example, an array of bits representing database blocks of the snapshot 410b may be maintained, wherein a bit value of 1 indicates the database block is shared between snapshots 410a and 410b and a bit value of 0 indicates that the database block is not shared between snapshots 410a and 410b. Note that although, FIG. 4 indicates sharing between only two snapshots, the database blocks may be shared across multiple snapshots. For example, snapshot 410b may share database blocks with a plurality of snapshots. As shown in FIG. 4, the database block 440c corresponds to database block 420c but is stored separately since the data values stored in database block 420c were updated between times T1 and T2.

FIG. 4 shows that if an unmasked database block is masked to obtain a secure snapshot (e.g., secure snapshots 420a or 420b) from unsecure snapshots (e.g., un-secure snapshots 410a or 410b), the database block sharing module 350 determines that corresponding unmasked and masked database blocks are not shared 425a, 425b. This is so because the masking operation transforms the data of the unmasked database block and as a result, the data stored in a masked version of a database block (e.g., 430c, 450c) is different from the original data stored in the corresponding database block (e.g., 420c and 440c.)

The database block sharing module 350 determines that database blocks that are shared across two un-secure snapshots can also be shared across two secure snapshots if the database blocks do not store sensitive data that needs to be masked. This is so because these database blocks do not get modified during the masking process. FIG. 4 shows that database block 430a is shared between the secure snapshots 420a and 420b since the database block 430a does not include any sensitive data. Accordingly, the snapshots 420b simply stores a data structure 450a (for example, a pointer to the database block 430a) or information indicating that the database block 430a of the snapshots 420a should be accessed when a request for the corresponding data is received.

FIG. 4 shows masked database block 430b that stores masked data obtained by applying the masking function to unmasked database block 420b. The database block sharing module 350 determines that the database block 430b can be shared between the secure snapshots 420a and 420b. The database block sharing module 350 may determine this based on the information that the source database blocks 420b and 440b are shared across the un-secure snapshots 410a and 410b. Alternatively, the database block sharing module 350 determines that the database block 430b can be shared between the secure virtual database 420a and 420b by determining the data of the masked database block 460 and comparing the masked database block 460 with the masked database block 430b. Details of how the database block sharing module 350 determines whether two masked database blocks can be shared across virtual databases are further described herein, for example, in FIG. 6.

If unmasked database blocks between two un-secure snapshots are not shared, the corresponding masked database blocks of the secure snapshots are also not shared. For example, as shown in FIG. 4, the unmasked database blocks 420c of un-secure snapshots 410a and the unmasked database block 440c of un-secure snapshots 410b were not shared (for example, because the data was modified between the capturing of the point-in-time copies T1 and T2.) Accordingly the database block sharing module 350 determines that since the original database blocks 420c, 440c of the un-secure snapshots were not shared, the corresponding masked database blocks 430c and 450c of the masked snapshots 420a and 420b are also not shared.

Two masked database blocks may be shared across snapshots even if the data of the two database blocks is not identical. As shown in FIG. 4, the snapshot 420b stores a representation of the database block 460 that includes a pointer 450b that identifies the masked database block 430b storing the data. If the masked data of the database block 460 is not identical to the data of the masked database block 430b, the representation of the database block 460 also stores information 470 indicating the difference between the database blocks 460 and the database block 430b. The details of the representation of database block 460 are illustrated in FIG. 5.

Figure 5:
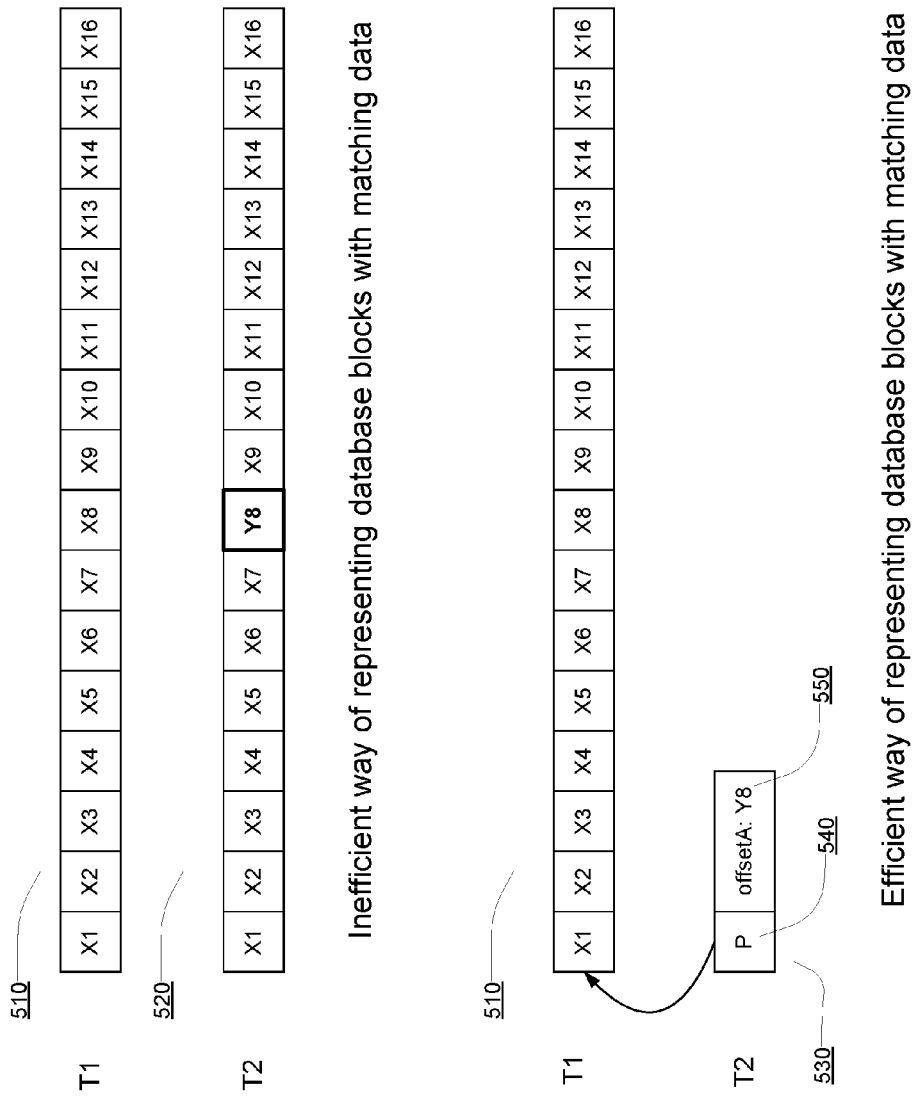
FIG. 5 illustrates a data structure for reusing a previously created masked database block for a secure snapshot, according to an embodiment of the invention.

FIG. 5 illustrates a data structure for reusing a previously created masked database block for a secure snapshot, according to an embodiment of the invention. FIG. 5 shows a data of a database block 510 for a secure snapshot S1 associated with a point in time T1 and a database block 520 for a secure snapshot S2 associated with a point in time T2. As shown in FIG. 5, the database block 510 comprises data X1, X2, X3, . . . X16. The data X1, X2, X3, . . . may be represented as any given unit of data, for example, a byte, a word, or a set of bytes or words. The database block 520 comprises data X1, X2, X3, . . . , Y8, . . . , X16. The data of the database block 520 is identical to the data of database block 510 except for the data X8 of database block 510 being replaced by data Y8 in database block 520.

The database storage system 100 stores metadata 530 representing the database block 520 that takes less storage space than the representation 520 that stores all the data. The database block sharing module 350 determines that the data of the database block 510 substantially matches the data of the database block 520. In other words, the database storage system 100 determines that the amount of storage space required to store the differences between the two database blocks, i.e., the portions of the data of the database block 520 that are different from the corresponding data of the database block 510 is less than a threshold value T. The threshold value T may be defined as a fixed threshold value or a fraction (e.g., percentage) of the size of a database block. In FIG. 5, the data of the database block 520 that is different from the corresponding data of the database block 510 is Y8.

The metadata 530 stores information 540 identifying the database block 510 (marked as pointer P in FIG. 5). The metadata 530 also stores information 550 identifying the difference between the data of the database block 520 compared to the data of the database block 510. The difference between the data of the database block 520 compared to the data of the database block 510 can be identified by locations of the data that is different and the actual data that is different. For example, the location of the data that is different can be represented as an offset value within the database block. The offset value may represent the number of bytes from the location of the first byte of the database block. In FIG. 5, the offset value is represented as offsetA and the difference value is represented as the data Y8. Although FIG. 5 shows an example of database blocks that differ at a single location, the metadata 530 can represent database blocks with differences occurring at multiple locations. If the database blocks 520 and 510 differ in multiple locations, the metadata 530 may store a list of offset and data value pairs, for example, "offsetA: Y8; offsetB: Y10."

In an embodiment, the database storage system 100 allocates storage space for representing metadata corresponding to each database block. The threshold value T of the amount of storage space required to store the differences between two database blocks is determined based on the amount of storage available in the metadata of a database block. In other words, if the difference between the database blocks 520 and 510 can be represented within the metadata of the database block 520, the database block sharing module 350 determines that the data of the database block should be used for database block 520 instead of storing a new database block corresponding to the database block 520. Accordingly, the database block sharing module 350 uses the efficient representation 530 for representing the database block 520. In other words, the database block sharing module 350 reuses the data of the database block 510 instead of allocating a separate database block to store the data of database block 520.

However if the database block sharing module 350 determines that the amount of storage required to represent the differences between the database blocks 520 and 510 is not less than the threshold value T, the database block sharing module 350 determines that the data of the database block 520 is stored as a new database block. In other words, the database block sharing module 350 determines not to share the database block 510 for representing the database block 520.

Creating and Accessing Secure Snapshots/VDBs

Figure 6:
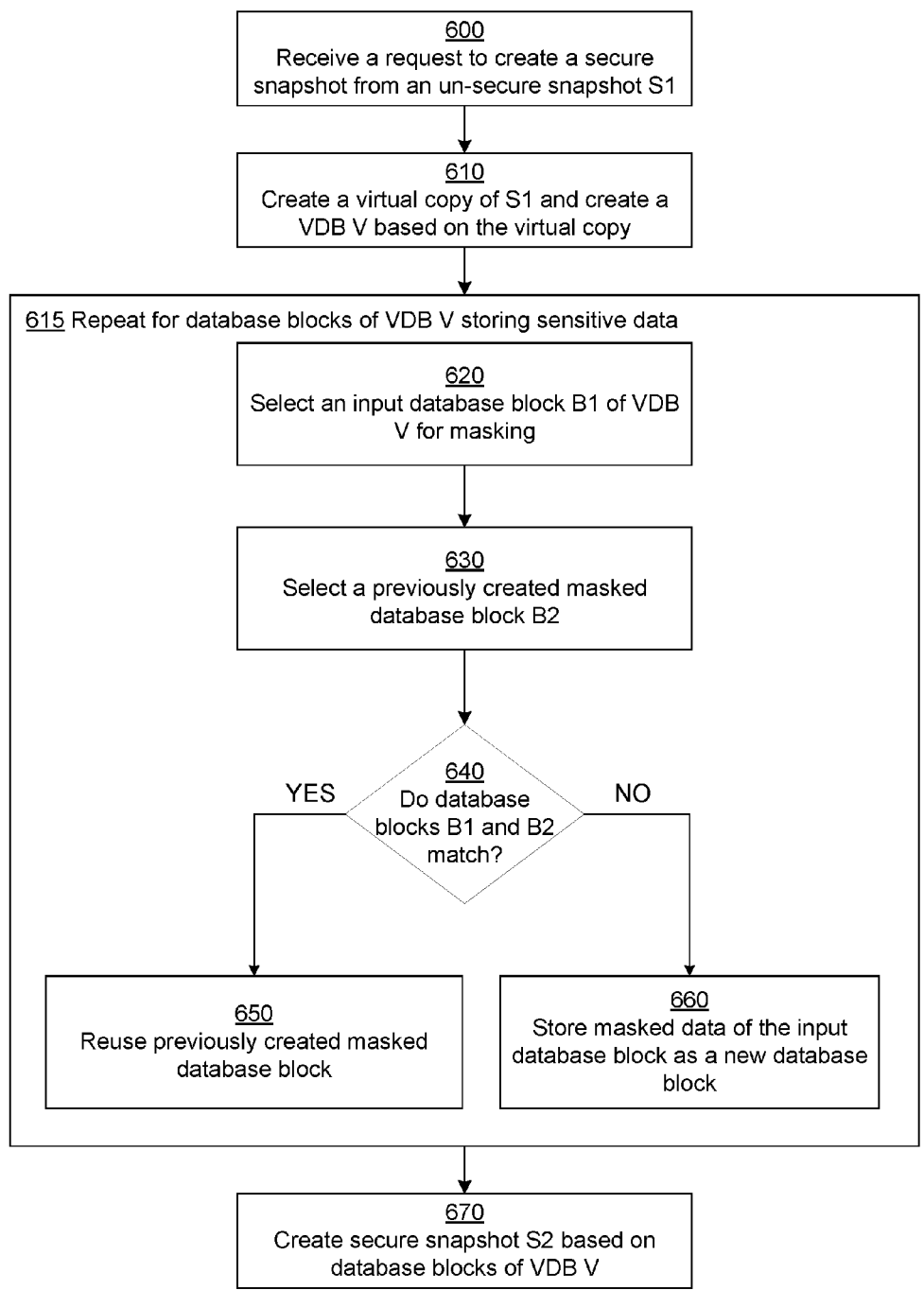
FIG. 6 is a flowchart of a process for creating secure snapshots/VDBs that reuse previously created masked database blocks, according to an embodiment of the invention.

FIG. 6 is a flowchart of a process for creating secure snapshots/VDBs that reuse previously created masked database blocks, according to an embodiment of the invention. The database storage system 100 receives 600 a request to create a secure snapshot based on an un-secure snapshot. The un-secure snapshot represents a point-in-time copy of data obtained from a source database. At least a portion of the data of the source database is identified as sensitive data. The database storage system 100 creates 610 a virtual copy of the un-secure snapshot. The virtual copy of the un-secure snapshot is a snapshot that may share all database blocks with the un-secure snapshot. The database storage system 100 also creates 610 a virtual database V based on the copy of the un-secure snapshot.

The database storage system 100 processes database blocks of the secure virtual database being created. The database storage system 100 either allocates a new database block or identifies an existing database block (for example, an existing database block of a previously created snapshot) to reuse for the secure virtual database V' being created. If an input database block does not include sensitive data, the database storage system 100 determines that the input database block does not have to be masked.

The database storage system 100 repeats the following steps (i.e., steps 620, 630, 640, 650, and 660) for every input database block that includes sensitive data that needs to be masked before the database block is stored in the storage system data store 360. The database block sharing module

350 selects 620 an input database block B1 that includes sensitive data for processing. The database block sharing module 350 determines whether there is any existing masked database block that can be reused instead of masking the input database block and storing the masked input database block as a newly allocated database block. Such blocks may be identified by finding the input block at the same logical location in the same database file from a previous virtual database or snapshot.

The database block sharing module 350 selects 630 a masked database block B2 stored in the storage system data store 360 for a previously created secure virtual database or snapshot. The masked database block B2 comprises masked data obtained by applying the masking function to sensitive data obtained from the source data.

Figure 7:
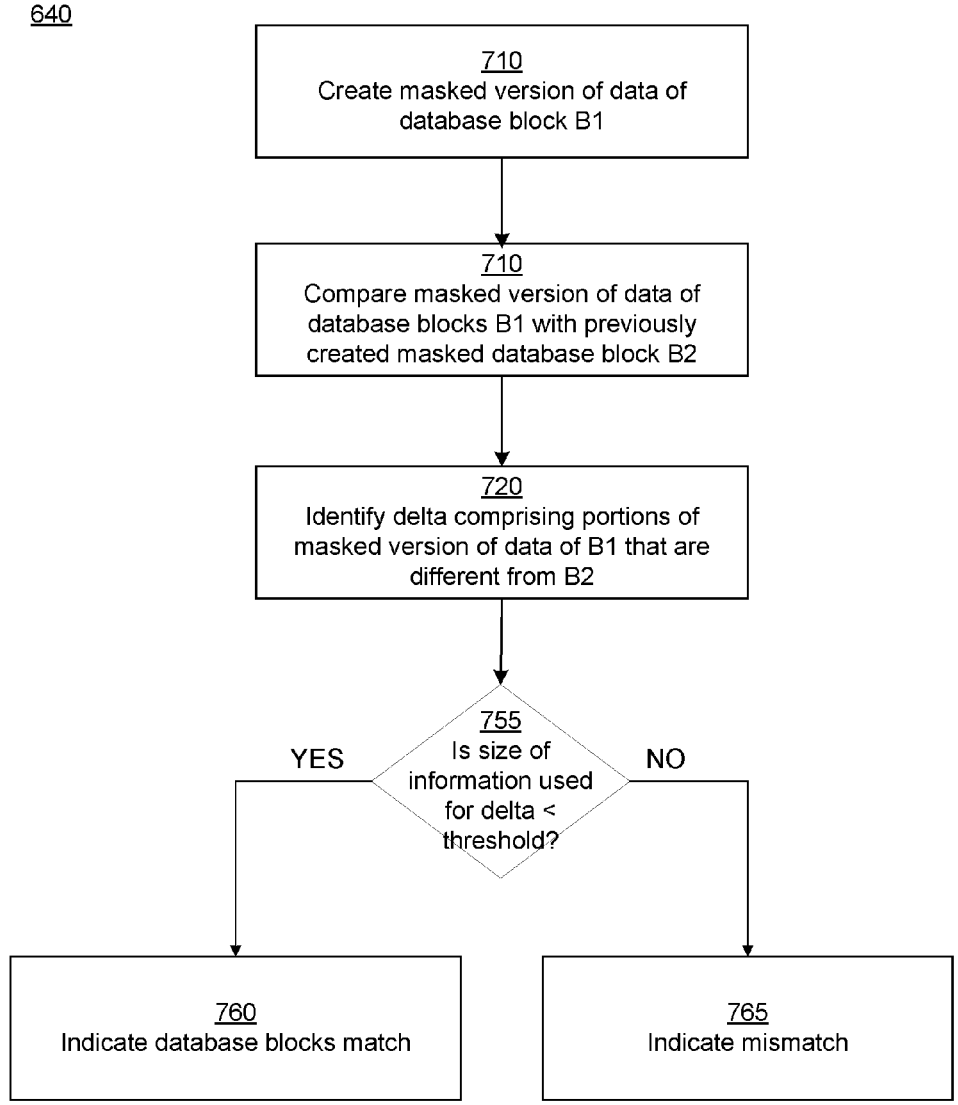
FIG. 7 is a flowchart of a process for matching database blocks to determine if a previously created masked database block can be reused as a database block for a secure snapshot or virtual database being created, according to an embodiment of the invention.

The database block sharing module 350 matches 640 the database blocks B1 and B2. In an embodiment, the database block sharing module 350 invokes the data transformation module 340 to mask the sensitive data of the database block B1. The database block sharing module 350 obtains a masked version of the database block B1. The database block sharing module 350 compares the masked version of the database block B1 against the masked database block B2. In another embodiment, the database block sharing module 350 compares only the masked sensitive data of database block B1 against the corresponding masked data of the database block B2. FIG. 7 below provides further details of how the data of the two database blocks B1 and B2 is matched.

The database block sharing module 350 determines based on the result of the matching, whether to reuse 650 the masked database block B2 as representing the masked version of database block B1 or to allocate and store 660 a new database block comprising the masked version of the input database block B1. Once all input database blocks for the secure virtual database are processed, the database storage system 100 creates 670 the requested secure snapshot S2 based on the database blocks of the secure VDB V'.

FIG. 7 is a flowchart of a process for matching database blocks to determine if a previously created masked database block can be reused as a database block for a secure snapshot or virtual database being created, according to an embodiment of the invention. The database block sharing module 350 invokes the data transformation module 340 to create 710 a masked version of data of the database block B1.

The database block sharing module 350 compares the masked version of data of database blocks B1 with the masked database block B2. The database block sharing module 350 identifies 720 the difference (referred to as delta) comprising portions of masked version of data of B1 that are different from B2. If the input database blocks used to obtain the masked version of B1 and the masked database block B2 are identical, the difference between the two may correspond to data that stores different transaction IDs obtained by performing the masking operations at different times.

The database block sharing module 350 determines 755 if the size of the information used to represent the difference (delta) is below a predetermined threshold. The predetermined threshold is determined based on an amount of information representing the delta that can be stored in metadata used for representing each database block. If the size of the delta is below a predetermined threshold, the database block sharing module 350 indicates 760 that the masked version of database blocks B1 matches the masked database block B2. If the size of the delta is exceeds the predetermined threshold, the database block sharing module 350 indicates 760 that the masked version of database blocks B1 does not match the masked database block B2.

Figure 8:
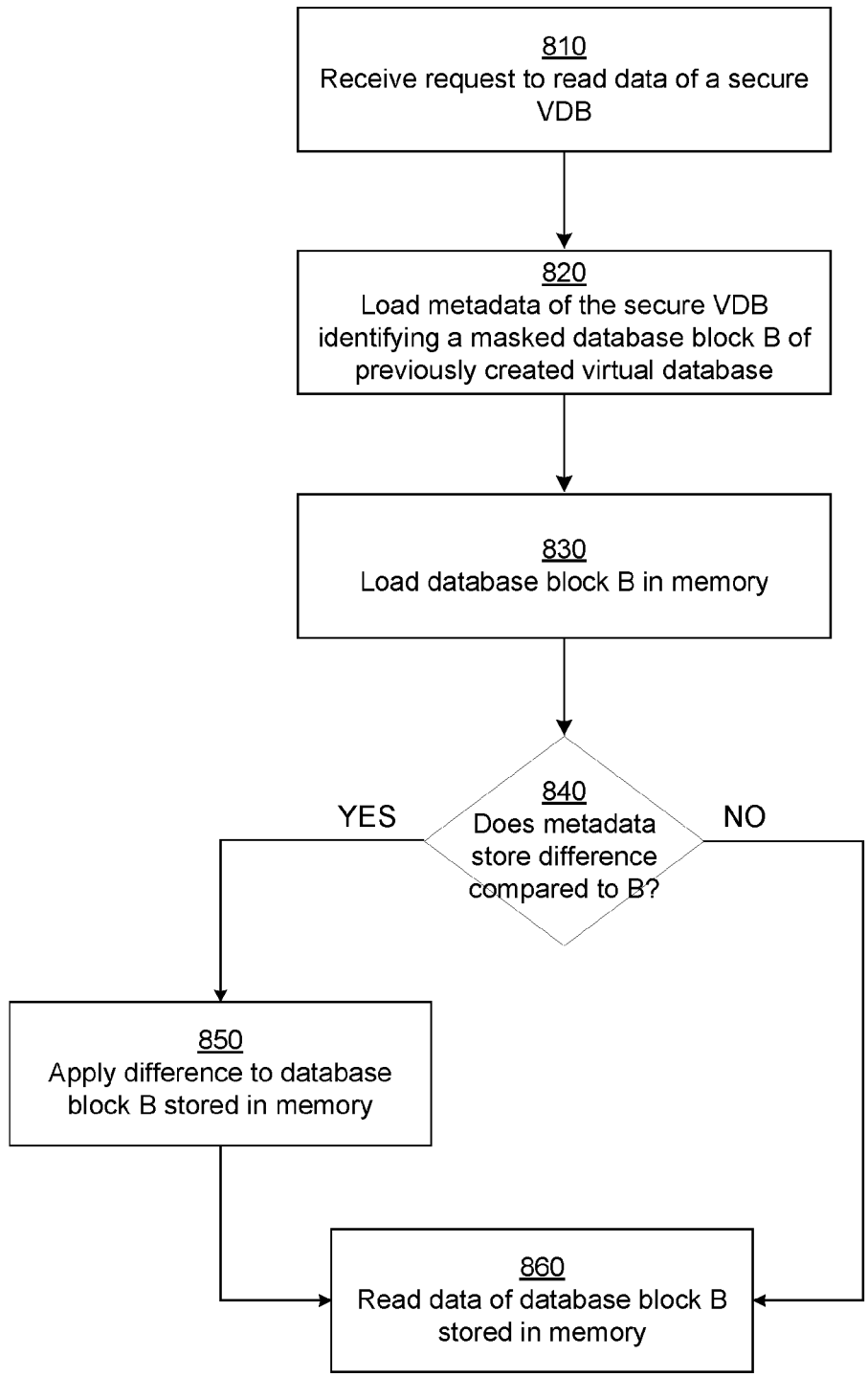
FIG. 8 is a flowchart of a process for accessing data of a secure virtual database, according to an embodiment of the invention.

FIG. 8 is a flowchart of a process for accessing data of a secure snapshot or virtual database, according to an embodiment of the invention. The data access module 370 receives 810 a request to read data of a secure virtual database. If the database block storing the requested data is stored as part of the data of the secure snapshot or virtual database, the data access module 370 loads the database block and accesses the requested data. However, if the database block is shared with a previously created snapshot or virtual database, the secure snapshot/VDB stores only metadata describing the database block.

The data access module 370 loads 820 the metadata of a database block of the secure snapshot/VDB. The metadata identifies a masked database block B of a previously created secure snapshot/VDB. The data access module 370 loads 830 the database block B in memory. The data access module 370 checks 840 if the metadata of the database block also stores a difference (i.e., delta) value compared to the database block B. If the metadata stores a difference value compared to the database block B, the data access module 370 applies the difference to the in-memory representation of the database block B. The data access module 370 reads the requested data from the in-memory representation of the modified database block B1 and provides the requested data. If the metadata does not include any difference compared to the database block B, the data access module 370 simply accesses the data of the database block B stored in-memory and provides the data.

Creating Snapshots/VDBs Storing Transformed Data

The mechanisms described herein for sharing masked database blocks can be used to share database blocks modified using any kind of transformation function, so long as the transformation function returns the same logical value for the same given input. For example, a transformation function may be applied to change the locale of strings or to translate language of a field. Other types of transformations may be applied when data is transformed from one type of representation to another type of representation, for example, if the virtual database is upgraded to a new version of the database software that requires updating database blocks, or is converted to a database software format on another system where the endianness is different.

Figure 9:
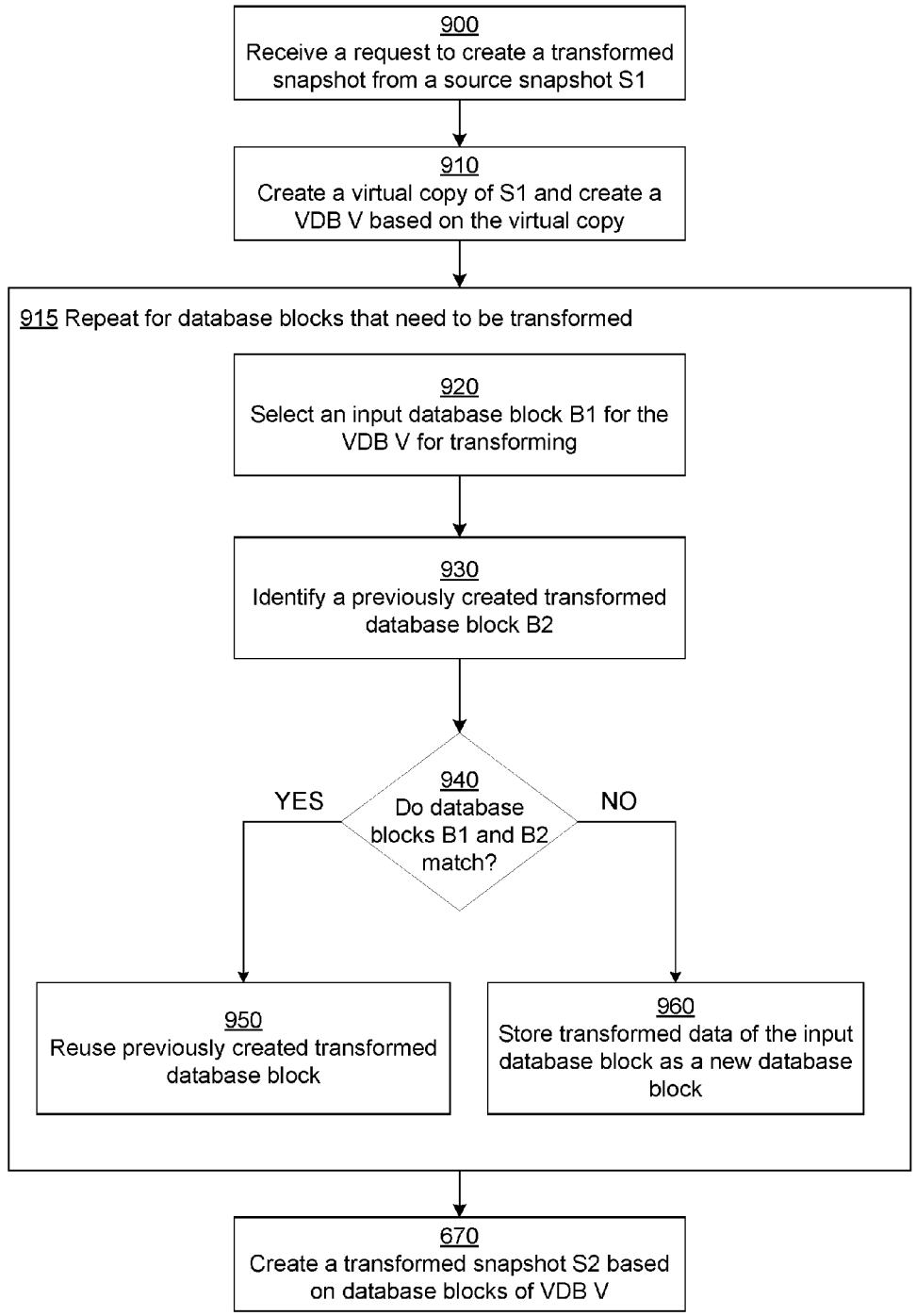
FIG. 9 is a flowchart of a process for creating snapshots/VDBs that reuse transformed database blocks created and stored previously in the database storage system, according to an embodiment of the invention.

The various processes and modules disclosed herein can be generalized to apply to various applications based on arbitrary transformation functions. Following is the description of FIG. 9 showing a flowchart of a process for creating snapshots/VDBs that reuse transformed database blocks created and stored previously in the database storage system, according to an embodiment of the invention. FIG. 9 illustrates a process similar to that of FIG. 6. The other processes, for example, those shown in FIGS. 7 and 8 can also be generalized.

The database storage system 100 receives 900 a request to create a snapshot with transformed data based on a source snapshot. The database storage system 100 creates 910 a virtual copy if the source snapshot S1. The database storage system also creates a VDB V based on the virtual copy of the source snapshot S1. The database storage system 100 identifies database blocks for the virtual database being created. The database storage system 100 either allocates a new database block or identifies an existing database block (for example, an existing database block of a previously created virtual databases) to reuse for the virtual database being created.

The database storage system 100 repeats the following steps (i.e., steps 920, 930, 940, 950, and 960) for every input database block that needs to be transformed before the database block is stored in the storage system data store 360. The database block sharing module 350 selects 920 an input database block B1 that includes data that needs to be transformed. The database block sharing module 350 determines whether there exists any transformed database block that can be reused instead of storing a new copy of the transformed input database block.

The database block sharing module 350 selects 930 a transformed database block B2 stored in the storage system data store 360 for a previously created snapshot/VDB. The transformed database block B2 comprises transformed data obtained by applying the transformation function to data obtained from the source data.

The database block sharing module 350 matches 940 the database blocks B1 and B2. In an embodiment, the database block sharing module 350 invokes the data transformation module 340 to transform the sensitive data of the database block B1. The database block sharing module 350 obtains a transformed version of the database block B1. The database block sharing module 350 compares the transformed version of the database block B1 against the transformed database block B2.

The database block sharing module 350 determines based on the result of the matching, whether to reuse 950 the transformed database block B2 as representing the transformed version of database block B1 or to allocate and store 960 a new database block comprising the transformed version of the input database block B1. Once all input database blocks for the virtual database V are processed, the database storage system creates the transformed snapshot S2 based on the database blocks of the VDB V.

Additional Configuration Considerations

Techniques described herein for sharing masked database blocks across secure snapshots stored in the database storage system can also be used for sharing masked database blocks across secure virtual databases. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one. The singular also includes the plural unless stated otherwise.

Upon reading this disclosure, those of skill in the art will appreciate still additional alternative structural and functional designs for a system and a process for creating secure snapshots/virtual databases from point-in-time copies of source databases stored in a database storage system. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for creating a secure snapshot, the method comprising:
receiving, by a database storage system, information identifying a source database comprising database blocks storing sensitive data;
receiving a request to create a secure snapshot storing data associated with a point-in-time copy of the source database, the secure snapshot representing the sensitive data as masked data obtained by applying a masking function to the sensitive data;
creating, by the database storage system, the secure snapshot storing one or more masked database blocks comprising a masked representation of sensitive data, wherein at least a masked database block is shared with one or more other secure snapshots, the creating comprising:
identifying an input database block for including in the secure snapshot,
identifying a previously created database block of a previously created secure snapshot wherein the previously created database block stores masked data obtained by applying the masking function to a portion of sensitive data, determining that the input database block and the previously created database block match, and storing metadata identifying the previously created database block as representing the input database block if the input database block and the previously created database block are determined to match; and accessing the secure snapshot, wherein accessing the secure snapshot comprises retrieving data of the masked database block by using the stored metadata to access the previously created database block of the previously created secure snapshot.

2. The method of claim 1, wherein determining whether the previously created database block matches the input database block comprises:

generating a masked input database block, the masked input database block obtained by masking sensitive data of the input database block; and comparing the masked input database block with the previously created database block of the previously created secure snapshot.

3. The method of claim 2, wherein the previously created database block is determined to match the input database block if the masked input database block is identical to the previously created database block.

4. The method of claim 2, wherein the previously created database block is determined to match the input database block if the masked input database block differs from the previously created database block and the difference between the previously created database block and the input database block can be represented in less than a threshold amount of storage space.

5. The method of claim 4, wherein the difference between the previously created database block and the input database block is represented by data comprising:

an offset indicating a location within the previously created database block where the data of the previously created database block is different from the masked input database block, and a value of the data of the masked input database block at the location.

6. The method of claim 4, wherein creating the secure snapshot comprises:

responsive to determining that the previously created database block fails to match the input database block, storing the masked input database block as a new database block for the secure snapshot.

7. The method of claim 6, wherein determining that the previously created database block fails to match the input database block comprises:

generating a masked input database block by masking the sensitive data of the input database block;

comparing the masked input database block with the previously created database block to determine a difference between the masked input database block and the previously created database block; and determining that the masked input database block fails to match the previously created database block if the difference between the masked input database block and the previously created database block takes more than a threshold amount of storage space to represent.

8. The method of claim 1, wherein accessing the secure snapshot further comprises:

receiving a request to access data of the secure snapshot;

determining whether the requested data is stored in a database block represented as metadata, wherein the metadata comprises:

information identifying a database block of a previously created snapshot, and information indicating a difference to be applied to the identified database block; and accessing the identified database block and applying the difference value to the identified database block.

9. The method of claim 8, wherein the information indicating the difference value comprises a location of the difference value in the identified database block and the difference value, wherein applying the difference value to the identified database block:

replacing data of the identified database block at the location by the difference value.

10. The method of claim 1, further comprising:

receiving and storing, by the database storage system, a plurality of point-in-time copies of database blocks of the source database wherein a point-in-time copy shares database blocks with one or more other point-in-time copies.

11. The method of claim 1, wherein the database storage system stores a plurality of snapshots associated with the source database, wherein a snapshot shares database blocks with one or more other snapshots.

12. A method for creating a snapshot, the method comprising:

receiving, by a database storage system, information identifying a source database comprising database blocks;

receiving a request to create a snapshot storing data associated with a point-in-time copy of the source database, the snapshot representing at least a portion of the data of the source database as transformed data obtained by applying a transformation function to the portion of the data;

creating, by the database storage system, the snapshot storing one or more transformed database blocks, wherein at least a transformed database block is shared with one or more other snapshots, the creating comprising:

identifying an input database block for including in the snapshot, identifying a previously created database block of a previously created virtual snapshot wherein the previously created database block stores transformed data obtained by applying the transformation function to a portion of data of the database block, determining that the input database block and the previously created database block match, and storing metadata identifying the previously created database block as representing the input database block if the input database block and the previously created database block are determined to match; and accessing the snapshot, wherein accessing the snapshot comprises retrieving data of the masked database block by using the stored metadata to access the previously created database block of the previously created snapshot.

13. The method of claim 12, wherein determining whether the previously created database block matches the input database block comprises:

generating a transformed input database block, the transformed input database block obtained by applying the transformation function to at least a portion of data of the input database block; and comparing the transformed input database block with the previously created database block of the previously created snapshot.

14. The method of claim 13, wherein the previously created database block is determined to match the input database block if the transformed input database block differs from the previously created database block and the difference between the previously created database block and the input database block can be represented in less than a threshold amount of storage space.

15. The method of claim 14, wherein the difference is represented by data comprising:
an offset indicating a location within the previously created database block where the data of the previously created database block is different from the transformed input database block, and
a value of the data of the transformed input database block at the location.

16. The method of claim 13, wherein creating the snapshot comprises:
responsive to determining that the previously created database block fails to match the input database block, storing the transformed input database block as a new database block for the snapshot being created.

17. The method of claim 16, wherein determining that the previously created database block fails to match the input database block comprises:
generating a transformed input database block by transforming the data of the input database block;
comparing the transformed input database block with the previously created database block to determine a difference between the transformed input database block and the previously created database block; and
determining that the transformed input database block fails to match the previously created database block if the difference between the transformed input database block and the previously created database block takes more than a threshold amount of storage space to represent.

18. The method of claim 12, wherein accessing the snapshot further comprises:
receiving a request to access data of the snapshot;
determining whether the requested data is stored in a database block represented as metadata, wherein the metadata comprises:
information identifying a database block of a previously created snapshot, and
information indicating a difference to be applied to the identified database block; and
accessing the identified database block and applying the difference value to the identified database block.

19. A non-transitory computer-readable storage medium storing instructions for:
receiving, by a database storage system, information identifying a source database comprising database blocks storing sensitive data;
receiving a request to create a secure snapshot storing data of the source database, the secure snapshot representing the sensitive data as masked data obtained by applying a masking function to the sensitive data;
creating, by the database storage system, the secure snapshot storing one or more masked database blocks comprising a masked representation of sensitive data, wherein at least a masked database block is shared with one or more other secure snapshots, the creating comprising:
identifying an input database block for including in the secure snapshot,
identifying a previously created database block of a previously created secure snapshot wherein the previously created database block stores masked data obtained by applying the masking function to a portion of sensitive data,
determining that the input database block and the previously created database block match, and
storing metadata identifying the previously created database block as representing the input database block if the input database block and the previously created database block are determined to match; and
accessing the secure snapshot, wherein accessing the secure snapshot comprises retrieving data of the masked database block by using the stored metadata to access the previously created database block of the previously created secure snapshot.

20. The non-transitory computer-readable storage medium of claim 19, wherein determining whether the previously created database block matches the input database block comprises:
generating a masked input database block, the masked input database block obtained by masking sensitive data of the input database block;
comparing the masked input database block with the previously created database block of the previously created secure snapshot; and
determining that the masked input database block matches the previously created database block if the masked input database block differs from the previously created database block and the difference between the previously created database block and the input database block can be represented in less than a threshold amount of storage space.

21. The non-transitory computer-readable storage medium of claim 20, wherein the difference between the previously created database block and the input database block is represented by data comprising:
an offset indicating a location within the previously created database block where the data of the previously created database block is different from the masked input database block, and
a value of the data of the masked input database block at the location.

22. The non-transitory computer-readable storage medium of claim 19, wherein the previously created database block is determined to match the input database block if the masked input database block is identical to the previously created database block.

23. The non-transitory computer-readable storage medium of claim 19, wherein accessing the secure snapshot further comprises:
receiving a request to access data of the secure snapshot;
determining whether the requested data is stored in a database block represented as metadata, wherein the metadata comprises:
information identifying a database block of a previously created snapshot, and
information indicating a difference to be applied to the identified database block; and
accessing the identified database block and applying the difference value to the identified database block.

24. A non-transitory computer-readable storage medium storing instructions for:
receiving, by a database storage system, information identifying a source database comprising database blocks;
receiving a request to create a snapshot storing data associated with a point-in-time copy of the source database, the snapshot representing at least a portion of the data of the source database as transformed data obtained by applying a transformation function to the portion of the data;

creating, by the database storage system, the snapshot storing one or more transformed database blocks, wherein at least a transformed database block is shared with one or more other snapshots, the creating comprising:
- identifying an input database block for including in the snapshot,
- identifying a previously created database block of a previously created virtual snapshot wherein the previously created database block stores transformed data obtained by applying the transformation function to a portion of data of the database block,
- determining that the input database block and the previously created database block match, and
- storing metadata identifying the previously created database block as representing the input database block if the input database block and the previously created database block are determined to match; and accessing the snapshot, wherein accessing the snapshot comprises retrieving data of the masked database block by using the stored metadata to access the previously created database block of the previously created snapshot.

25. The non-transitory computer-readable storage medium of claim 24, wherein determining whether the previously created database block matches the input database block comprises:
- generating a transformed input database block, the transformed input database block obtained by applying the transformation function to at least a portion of data of the input database block;
- comparing the transformed input database block with the previously created database block of the previously created snapshot; and
- determining that the transformed input database block matches the previously created database block if the transformed input database block differs from the previously created database block and the difference between the previously created database block and the input database block can be represented in less than a threshold amount of storage space.

26. The non-transitory computer-readable storage medium of claim 25, wherein the difference is represented by data comprising:
- an offset indicating a location within the previously created database block where the data of the previously created database block is different from the transformed input database block, and
- a value of the data of the transformed input database block at the location.

27. The non-transitory computer-readable storage medium of claim 24, wherein the previously created database block is determined to match the input database block if the masked input database block is identical to the previously created database block.

28. The non-transitory computer-readable storage medium of claim 24, wherein accessing the snapshot further comprises:
- receiving a request to access data of the snapshot;
- determining whether the requested data is stored in a database block represented as metadata, wherein the metadata comprises:
  - information identifying a database block of a previously created snapshot, and
  - information indicating a difference to be applied to the identified database block; and
- accessing the identified database block and applying the difference value to the identified database block.

* * * * *